(12) United States Patent
Huber et al.

(10) Patent No.: US 7,943,116 B1
(45) Date of Patent: May 17, 2011

(54) HIGH-YIELD SYNTHESIS OF BROOKITE TIO₂ NANOPARTICLES

(75) Inventors: Dale L. Huber, Albuquerque, NM (US); Todd C. Monson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 469 days.

(21) Appl. No.: 12/018,828

(22) Filed: Jan. 24, 2008

(51) Int. Cl.
 *C01G 23/047* (2006.01)
(52) U.S. Cl. ..................................... 423/610
(58) Field of Classification Search ......... 136/243–254; 423/610, 417
 See application file for complete search history.

(56) References Cited

U.S. PATENT DOCUMENTS

| | | | |
|---|---|---|---|
| 2005/0063898 A1* | 3/2005 | Ja Chisholm | 423/608 |
| 2005/0123471 A1* | 6/2005 | Nakano et al. | 423/610 |
| 2006/0239902 A1* | 10/2006 | Kimura et al. | 423/594.17 |
| 2010/0055028 A1* | 3/2010 | Scott et al. | 423/610 |

FOREIGN PATENT DOCUMENTS

JP 2001246247 A * 9/2001

OTHER PUBLICATIONS

Park et al. "Effect of Catalyst and Solvent on PbTiO3 Fibers Prepared from Triethanolamine complexed Titanium Isopropoxide", 1999, Journal of Sol-Gel Science and Technology, vol. 14, 149-162.*

Mizojiri et al. "Generation of a Silylethylene-Titanium Alkoxide Comples. A Versatile Reagent for Silylethylation and Silylethylidenation of Unsaturated Compounds" Sep. 2000, J.Org. Chem. vol. 65, 6217-6222.*

Aruna et al. "Nanosize rutile titania particle synthersis via a hydrothermal method without mineralizers", Aug. 2000, Journal of Materials Chemistry, vol. 10, 2388-2391.*

Nataliya Ya. Turova et al, "The Chemistry of Metal Alkoxides", Chapter 9, pp. 107-111; 115-122.

Jing Tang, et al, "An Organometallic Synthesis of TiO2 Nanoparticles", Nano Letters, 2005, vol. 5, No. 3 pp. 543-548.

Zheng Yanquing et al, "Hydrothermal preparation and characterization of brookite-type TiO2 nanocrystallites", Journal of Materials Science Letters, vol. 19, 2000, pp. 1445-1448.

Xisheng Ye et al, "Thermoanalytical characteristic of nanocrystalline brookite-based titanium dioxide", NanoStructured Materials, vol. 8, No. 7, 1977, pp. 919-927.

* cited by examiner

*Primary Examiner* — Wayne Langel
*Assistant Examiner* — Syed Iqbal
(74) *Attorney, Agent, or Firm* — Carol I Ashby

(57) ABSTRACT

A method for forming non-agglomerated brookite TiO₂ nanoparticles without the use of expensive organic surfactants or high temperature processing. Embodiments of this invention use titanium isopropoxide as the titanium precursor and isopropanol as both the solvent and ligand for ligand-stabilized brookite-phase titania. Isopropanol molecules serve as the ligands interacting with the titania surfaces that stabilize the titania nanoparticles. The isopropanol ligands can be exchanged with other alcohols and other ligands during or after the nanoparticle formation reaction.

12 Claims, 2 Drawing Sheets

Add dilute water-in-isopropanol solution to solution of titanium isopropoxide and silane in isopropanol.

Mix until silane-stabilized titania nanoparticles form.

Optionally recover silane-stabilized titania nanoparcitles from reaction solution.

HIGH-YIELD SYNTHESIS OF BROOKITE TIO$_2$ NANOPARTICLES

The United States Government has rights in this invention pursuant to Department of Energy Contract No. DE-AC04-94AL85000 with Sandia Corporation.

BACKGROUND OF THE INVENTION

This invention relates to a method of synthesis of the brookite phase of titanium dioxide.

Titanium dioxide is found in three crystallographic phases: the tetragonal rutile phase, the tetragonal anatase phase, and the orthorhombic brookite phase. The rutile phase is the stable phase, while the anatase and brookite phases are metastable with respect to rutile. Both anatase and rutile are readily synthesized at low temperature, but it is difficult to prepare pure brookite without appreciable amounts of anatase or rutile being mixed in with the brookite.

A wet chemical method for synthesizing brookite-based TiO$_2$ has been reported by Ye and coworkers (X. Ye, J. Sha, Z. Jiao, and L. Zhang, "Thermoanalytical characteristic of nanocrystalline brookite-based titanium dioxide," Nano-Structured Materials, Vol. 8 (1997) pp. 919-927). The brookite TiO$_2$ material was prepared in an ice-bath by using aqueous TiCl$_4$ (0.03M), 2-ethyl hexanol (hydrocarbon), and sorbitan mono-oleate (surfactant) as the starting materials. Using ultrasonic agitation to accelerate the process, the microemulsified TiCl$_4$ was precipitated as Ti(OH)$_4$ by adding an aqueous NH$_3$ solution (0.5M). Then the precipitated hydroxide was filtered and washed with pure water. Finally, to obtain the TiO$_2$ powder, the precipitate was calcinated at 250° C. for 30 min. X-ray diffraction (XRD) analysis showed the product was brookite-based with a certain amount of anatase and rutile. Percentages of each phase were determined using XRD-phase-contrast analysis: brookite=40.8%, anatase=32.7%, rutile=26.5%. The authors report that, in the course of heating, there is a slow brookite-to-anatase transition below 780° C. Between 780 and 850° C., there is a rapid brookite-to-anatase transformation and a rapid anatase-to-rutile transition and rapid grain size growth. The brookite grain size formed at 250° C. was 15.5 nm, as determined by the XRD (121) peak.

Hydrothermal synthesis of brookite-type TiO$_2$ nanocrystallites has been reported by Zheng Yanqing and coworkers (Zheng Yanqing, Shi Erwei, Li Wenjun, and Hu Xingfang, "Hydrothermal preparation and characterization of brookite-type TiO$_2$ nanocrystallites," J. Mater. Sci. Lett. Vol. 19 (2000) pp. 1445-1448). A solution NaOH was added dropwise to a solution of Ti(SO$_4$)$_2$ under stirring. The molar ratio of Ti(SO$_4$)$_2$ to NaOH was kept at 1:5. The resulting white precipitate was washed with water to remove SO$_4^{2-}$ and autoclaved with water as a reaction medium for hydrothermal reaction. Alternatively, a solution of NaOH is added to a solution of TiCl$_4$ to adjust the pH of the solution to be greater than 8; a basic colloidal solution is formed, which is autoclaved. Hydrothermal reactions are run at temperatures of 200, 250, or 300° C. for 24 hours. With titanium chloride precursor, brookite phase is obtained at 200° C. and above. With titanium sulfate precursor, brookite phase is obtained at 250° C. and above.

Tang and coworkers have reported a synthesis of TiO$_2$ nanoparticles that uses the low-temperature reaction of low-valent organometallic precursors. Bis(cyclooctatetraene)titanium reacts with dimethyl sulfoxide in organic solution at temperatures as low as room temperature to produce TiO$_2$ In the absence of any supporting ligand, the reaction gives precipitation of amorphous TiO$_2$ powder; in the presence of basic ligands such as tributylphosphine, tributylphosphine oxide and trioctylphosphine oxide, the precipitation is arrested, and chemically distinct, isolated, internally crystalline TiO$_2$ nanoparticles are formed. Operations were conducted with the exclusion of air and water. (J. Ting, F. Redl, Y. Zhu, T. Siegrist, L. E. Brus, and M. L. Steigerwald, "An Organometallic Synthesis of TiO$_2$ Nanoparticles," Nano Letters vol. 5 (2005) pp. 543-548.)

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

This invention comprises a method for forming non-agglomerated brookite TiO$_2$ nanoparticles without the use of expensive organic surfactants or high temperature processing. Embodiments of this invention use titanium isopropoxide as the titanium precursor and isopropanol as both the solvent and ligand for ligand-stabilized brookite-phase titania. Isopropanol molecules serve as the ligands interacting with the titania surfaces that stabilize the titania nanoparticles. The isopropanol ligands can be exchanged with other alcohols and other ligands. Exchange with longer-chain alcohols can be used to increase particle separation of the non-agglomerated brookite titania nanoparticles.

The hydrolysis of titanium alkoxides consisting of short-chain primary alkoxides (most commonly ethoxide and n-butoxide) has been used successfully to produce titania nanoparticles. Because the primary alkoxide species exist as oligomers in solution, their hydrolysis reactions are relatively slow and controllable. Because of their relatively slow kinetics, these reactions require the addition of a catalyst (acid or base) or the application of heat to achieve full hydrolysis.

In contrast, titanium isopropoxide exists in solution as a monomeric species and undergoes very fast hydrolysis. The very rapid hydrolysis of titanium isopropoxide has long been believed to be uncontrollable and therefore impossible to use in the synthesis of discrete, well-dispersed nanoparticles. Previous approaches employed by others resulted in a wide particle size distribution and particle agglomeration rather than discrete nanoparticles of a relatively narrow size range. Consequently, the hydrolysis of titanium isopropoxide has been used to produce sols and films but never discrete particulates. While in general the kinetics of the reaction are fast, complicated, and difficult to control, the method of this invention provides unprecedented reaction control and produces high-quality nanoparticles. The method of this invention does not require the use of acid or base catalysts or the application of heat to produce the brookite-phase titania nanoparticles.

Figure 1:
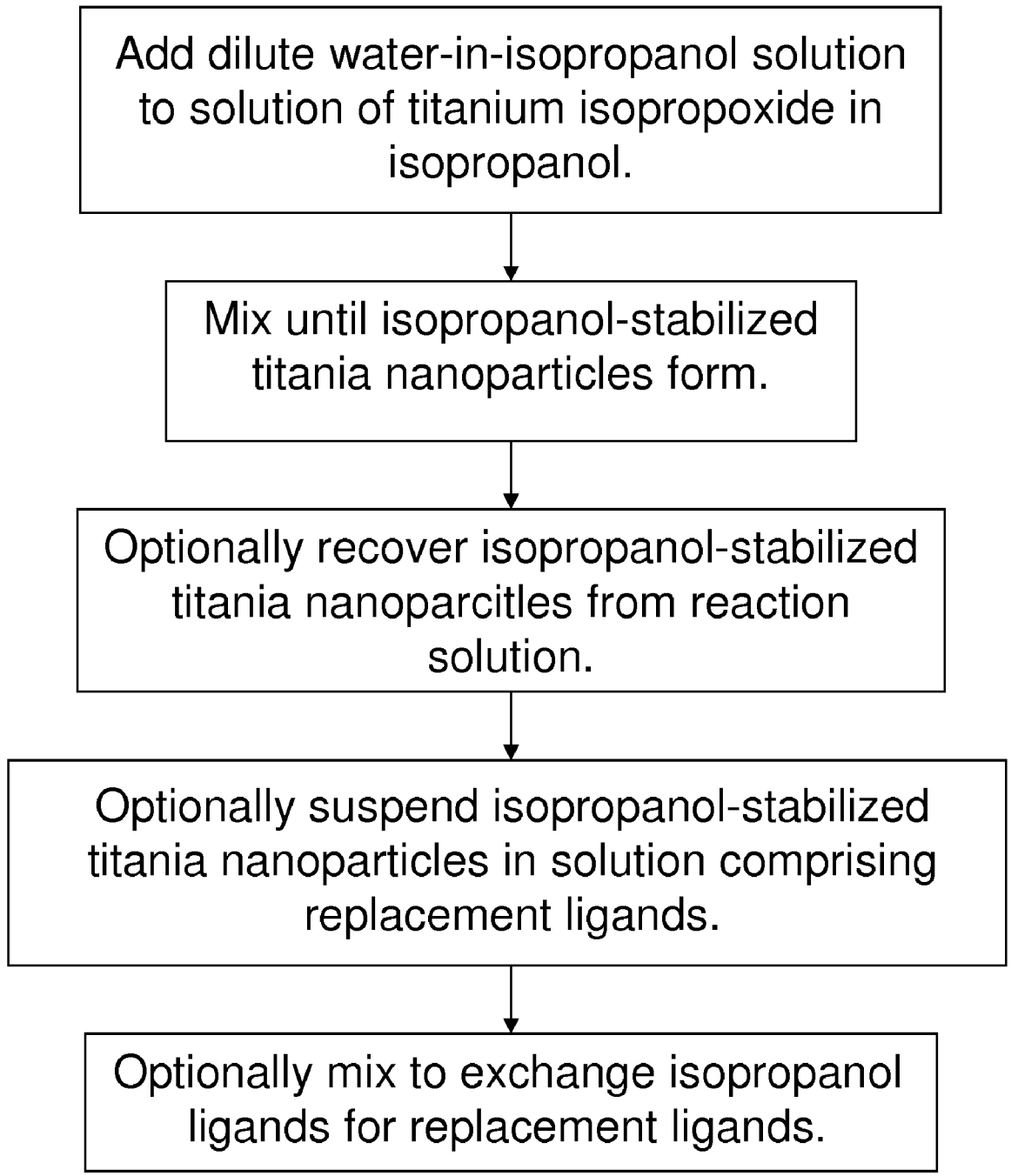
FIG. 1 illustrates an embodiment of the method of this invention that optionally includes exchanging isopropanol ligands and replacement ligands after the nanoparticle formation reaction.

FIG. 1 illustrates some embodiments of this invention. Embodiments of this invention use hydrolysis of a titanium alkoxide (titanium (IV) isopropoxide) in isopropanol to produce titania nanoparticles. Embodiments of this invention are different from previous unsuccessful attempts of others to grow titania nanoparticles because these embodiments use the organic solvent isopropanol as a ligand to control particle growth and to passivate the particles' surfaces. Isopropanol also serves as a solvent in the reaction. By diluting the titanium precursor with isopropanol and providing the water slowly using a dilute water/isopropanol mixture, the reaction rate is slowed and the nanoparticle growth is controlled. This method yields well-formed nanoparticles; the particle size range in the specific embodiments discussed herein range from 10 to 30 nm. Once formed, the particles are stable in isopropanol but can be centrifuged or dried and recovered in powder form. The isopropanol ligands can also be exchanged with longer-chain alcohols and other ligands. Additional ligand types include but are not restricted to carboxylic acids, phosphonic acids, amines, phosphines, phosphine oxides, alkoxysilanes including but not restricted to trimethoxysilanes and triethoxysilanes, other silanes, and silane coupling agents.

In one embodiment, isopropanol and titanium isopropoxide were combined at a volumetric ratio of 25:1. An isopropanol:water (400:1 by volume) mixture was slowly dripped into the 25:1 isopropanol/titanium isopropoxide mixture while it was being stirred. In other embodiments, other isopropanol/water ratios may be used. A titanium isopropoxide:water molar ratio of 2.5:1 was used. This reaction mixture was stirred for several hours. Titania nanoparticles are recovered from the excess solvent through unheated evaporation, rotary evaporation, or centrifuging. A pale white or almost clear powder is recovered. Isolated particles and piles of relatively small numbers of particles appear clear. The titania nanoparticles are shown by nuclear magnetic resonance (NMR) and infrared spectroscopies to have isopropanol ligands on the particle surface. The particles of this embodiment can be redispersed in many common polar solvents. Some examples of suitable polar solvents include but are not restricted to short-chain alcohols such as methanol, ethanol, n-propanol, isopropanol, and chloroform.

Selected area electron diffraction (SAED) shows that the titania nanoparticles are of the brookite phase. High-resolution transmission electron micrographs (HRTEM) show the titania nanoparticles to be polycrystalline with lattice spacings characteristic of the brookite phase. X-ray diffraction (XRD) of the particles is characteristic of the brookite phase. Heating the particles above a temperature of 350° C. produces a phase change from brookite to anatase with sintering into larger particles.

A variety of isopropanol: titanium isopropoxide ratios may be used. The isopropanol:titanium isopropoxide volumetric ratio is selected to favor the formation of nanoparticles rather than larger micron-scale particles. Low volumetric ratios favor formation of micron-sized or larger particles due to excessively rapid reaction. Volumetric ratios down to approximately 15:1 are expected to display kinetic behavior consistent with nanoparticle formation. Ratios as high as 125:1 have been successfully employed in some embodiments to produce nanoparticles. Higher ratios may be used, but the reaction will be slower, lengthening the particle formation time.

For a given titanium isopropoxide:isopropanol mixture, a suitable isopropanol:water ratio may be selected in accordance with the following considerations. With higher water fractions, the reaction becomes faster, which produces more agglomeration, more irregular particles, and larger particle sizes and size distributions. With lower water fractions, the reactions proceed more slowly, lengthening the time required for completing the particle formation reactions. For example, with a 25:1 isopropanol/titanium isopropoxide mixture, decreasing the isopropanol:water ratio to 100:1 can produce greater agglomeration and irregular particles. With a 60:1 isopropanol:water ratio, micron-sized particles were formed. For the 25:1 isopropanol/titanium isopropoxide mixture, a 400:1 isopropanol:water ratio is convenient since the water is sufficiently dilute that minor changes in addition rate, such as may occur due to variations in the size of drops added to the reaction solution or variation in the speed of addition of the drops, will not significantly affect the synthesis rate and controlled nanoparticle growth is readily achieved. Changes in the isopropanol/titanium isopropoxide ratio will change the preferred range of water:isopropanol ratios that produce properly slow reaction to produce discrete, relatively uniformly sized nanoparticles instead of micron-sized particles, excessive agglomeration, or irregular particles. A dilute water-in-isopropanol solution is defined as one where the water concentration is sufficiently low to produce a sufficiently slow reaction upon addition to the isopropanol/titanium isopropoxide solution that discrete nanoparticles are produced. The rate of addition is sufficiently slow when the introduction of water into the reaction solution produces nanoparticles rather than micron-sized particles and/or amorphous material.

A suitable molar ratio of titanium isopropoxide to water is one for which the reaction proceeds sufficiently slowly to produce nanoparticles instead of micron-sized particles or excessive agglomeration of particles. A factor in determining a suitable titanium isopropoxide:water ratio is the speed at which the water is introduced into the reaction mixture. If the water is properly dilute in the isopropanol and it is added at a sufficiently slow rate, a range of molar ratios may be used. Once all the titanium isopropoxide has reacted with water to form titania nanoparticles, addition of further water does not lead to deleterious reactions of the titania nanoparticles. Embodiments with a final ratio up to 1:7 were successful for the production of titania nanoparticles when proper reactant concentrations and reactant combination times were employed A variety of mixing times and mixing methods may be employed. For a given combination of isopropanol:titanium isopropoxide ratio, isopropanol:water ratio, and addition rate of the water solution to the titanium isopropoxide solution, the minimum mixing time is selected to allow the reaction to go to completion and substantially achieve equilibrium. A minimum mixing time may be determined by taking aliquots from the reaction vessel for confirmation of nanoparticle formation through UV-visible spectroscopy and/or microscopy. Mixing for several hours is sufficient to obtain essentially complete reaction for a range of solution ratios without specific diagnostic measurements. In most embodiments, a stirring time of four or more hours is sufficient.

The nanoparticles formed by the reaction of titanium isopropoxide with water in isopropanol have isopropanol ligands at the titanium dioxide surface that serve to stabilize the nanoparticles against becoming stuck together. These isopropanol ligands may be exchanged for other ligands to provide desired surface functionalities on the titania nanoparticles. In various embodiments, the isopropanol-stabilized nanoparticles are recovered from the reaction solution. The ligand-stabilized nanoparticles are suspended in a ligand exchange solution containing the replacement ligand to be exchanged with the isopropanol; sonication is one effective method of rapidly achieving the suspension; other mixing methods may be used. In one embodiment, isopropanol was exchanged with decanol. Good particle separation is provided by the surface decanol. In this embodiment, the particles were ultrasonicated in a 1% (v/v) solution of alcohol and chloroform followed by stirring the particles in the solution for several hours. Sonication was performed for 1 hour; other times may be used provided there is sufficient time for breaking up any clumps of particles to allow the exchanging ligands to interact effectively with the particle surfaces. Stirring was performed for several hours to all time for the ligand exchange reaction to go essentially to completion. This is a commonly used time for other types of ligand exchanges reported in the literature; different stirring times may be employed that permit adequate time for the ligand exchange reaction to go essentially to completion. To determine a minimum time for adequate exchange, aliquots could be removed from the solution and the nanoparticles examined using FTIR spectroscopy to determine the completeness of the ligand exchange. The volume percentage of alcohol chosen was typical of those reported in the literature for other ligand exchange reactions; other percentages may be used provided they provide sufficient quantity of new ligand to exchange with the original surface-bound ligands within a practical total reaction time. Chloroform is a useful solvent that is often reported in the literature for ligand exchanges because it is miscible with both polar and non-polar solvents. Other solvents that display similarly good miscibility in both polar and non-polar solvents may be used as the ligand-exchange solvent; examples include but are not restricted to $CH_2Cl_2$, $CH_3Cl$, and other solvents with proper miscibility characteristics. The ligand-exchanged particles were recovered by centrifuging or drying. Washing the particles after the exchange reaction with a suitable solvent that depends on the ligands exchanged can assist in the recovery of substantially pure ligand-exchanged nanoparticles. The decanol-exchanged particles may be redispersed in common organic solvents such as tetrahydrofuran (THF) and hexanes, among others.

Figure 2:
FIG. 2 illustrates an embodiment of the method of this invention that includes a stabilizing ligand in addition to isopropanol in the reaction solution to form titania nanoparticles where the stabilizing ligand is other than isopropanol.
Figure 2:

In one embodiment, an alternative ligand is dissolved in the titanium isopropoxide/isopropanol solution. FIG. 2 illustrates such an embodiment. In one embodiment, 1 mL titanium isopropoxide, 2 mL triethanolamine, and 4 mL vinyl terminated silane were added to 100 mL isopropanol. The vinyl terminated silane employed in this embodiment was trimethoxy(7-octen-1-yl)silane. Other silanes may also be employed in embodiments of this invention. The triethanolamine serves as a base catalyst for the reaction. Other compounds that work as base catalyts or acid catalysts may be used instead of the triethanolamine. A 400:1 isopropanol: water solution was added dropwise to the titanium isopropoxide-containing solution with stirring. The particle diameter was approximately 5 nm. HRTEM images show the particles to be highly crystalline and of the brookite phase of titania. The presence of vinyl terminated silane as a ligand on the surface of the particles has been shown using Fourier transform infrared (FT-IR) spectroscopy and nuclear magnetic resonance (NMR) spectroscopy.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for forming ligand-stabilized titania nanoparticles, comprising:
    adding a dilute water-in-isopropanol solution to an isopropanol solution of titanium isopropoxide to form a reaction solution, wherein the step of adding is performed at a sufficiently slow rate to avoid amorphous powder formation and micron-sized particle formation; and
    mixing the reaction solution until ligand-stabilized titania nanoparticles form.

2. The method of claim 1, further comprising stirring the isopropanol solution of titanium isopropoxide while adding the dilute water-in-isopropanol solution.

3. The method of claim 1, wherein the dilute water-in-isopropanol solution is added dropwise.

4. The method of claim 1, wherein the isopropanol solution of titanium isopropoxide has a volumetric ratio of isopropanol to titanium isopropoxide greater than or equal to approximately 15:1.

5. The method of claim 1, wherein the dilute water-in-isopropanol solution has a volumetric ratio of isopropanol to water greater than or equal to approximately 100:1.

6. The method of claim 1, wherein the isopropanol solution of titanium isopropoxide has an approximately 25:1 volumetric ratio of isopropanol to titanium isopropoxide and the dilute water-in-isopropanol solution has an approximately 400:1 volumetric ratio of isopropanol to water.

7. The method of claim 1, wherein the step of mixing is performed for at least one hour.

8. The method of claim 1, wherein the isopropanol solution of titanium isopropoxide further comprises a silane and triethanolamine.

9. The method of claim 8, wherein the silane is a vinyl terminated silane.

10. The method of claim 1, further comprising:
    isolating the ligand-stabilized titania nanoparticles from the reaction solution;
    suspending the ligand-stabilized titania nanoparticles in a ligand exchange solution, wherein the ligand exchange solution comprises replacement ligands for replacing ligands bound to surfaces of the ligand-stabilized titania nanoparticles;
    exchanging the ligands bound to the surfaces by the replacement ligands by mixing the ligand-stabilized titania nanoparticles in the exchange solution.

11. The method of claim 10, wherein the replacement ligands are selected from the group consisting of alcohols, carboxylic acids, phosphonic acids, amines, phosphines, phosphine oxides, and alkoxysilanes.

12. The method of claim 10, wherein the exchange solution comprises a solution of decanol in chloroform, the suspending is by sonication, and the mixing is by stirring for greater than approximately 1 hour.

* * * * *